US012778142B2

(12) United States Patent
Van Blokland

(10) Patent No.: US 12,778,142 B2
(45) Date of Patent: Nov. 3, 2026

(54) DEVICE, DOUGH LINE AND METHOD FOR ROLLING DOUGH

(71) Applicant: Radie B.V., Culemborg (NL)

(72) Inventor: Johannes Josephus Antonius Van Blokland, Culemborg (NL)

(73) Assignee: Radie B.V., Culemborg (NL)

( * ) Notice: Subject to any disclaimer, the term of this patent is extended or adjusted under 35 U.S.C. 154(b) by 569 days.

(21) Appl. No.: 18/112,792

(22) Filed: Feb. 22, 2023

(65) Prior Publication Data

US 2023/0263174 A1 Aug. 24, 2023

(30) Foreign Application Priority Data

Feb. 23, 2022 (NL) ...................................... 2031055

(51) Int. Cl.
*A21C 3/02* (2006.01)

(52) U.S. Cl.
CPC .................................... *A21C 3/025* (2013.01)

(58) Field of Classification Search
None
See application file for complete search history.

(56) References Cited

U.S. PATENT DOCUMENTS

| | | | |
|---|---|---|---|
| 5,178,891 A | 1/1993 | Morikawa et al. | |
| 5,246,363 A | 9/1993 | Morikawa | |
| 2018/0249721 A1* | 9/2018 | Brandauer | .............. B01F 27/61 |
| 2019/0223452 A1 | 7/2019 | Van Blokland | |

FOREIGN PATENT DOCUMENTS

| | | |
|---|---|---|
| DE | 2451442 A1 | 5/1976 |
| DE | 3238388 A1 | 5/1983 |
| DE | 20212725 U1 | 11/2002 |
| EP | 0478242 A1 | 4/1992 |
| EP | 2103217 A2 | 9/2009 |
| JP | S60237955 A | 11/1985 |

OTHER PUBLICATIONS

Fritsch EP2103217A2 English Translation 2009 (Year: 2009).*
Search Report & Written Opinion dated Sep. 27, 2022, Application No. NL2031055.

* cited by examiner

*Primary Examiner* — Jacob T Minskey
*Assistant Examiner* — Adrien J Bernard
(74) *Attorney, Agent, or Firm* — The Dobrusin Law Firm, P.C.

(57) ABSTRACT

The present invention relates to a device for rolling dough, comprising a conveyor, in particular an endless conveyor belt, for conveying a dough sheet in a direction of conveyance, a roller, for rolling the dough sheet with at least a directional component perpendicular to the direction of conveyance, wherein the device is configured for varying the distance between the upper surface of the conveyor and the roller during rolling.

5 Claims, 2 Drawing Sheets

DEVICE, DOUGH LINE AND METHOD FOR ROLLING DOUGH

The present invention relates to a device, dough line and a method for rolling dough. In particular the invention relates to rolling dough wherein the dough roller is moved perpendicular to a direction of conveyance of the dough, also referred to as cross rolling, wherein the dough is a dough sheet in a so called sheeting-type dough line.

In dough sheeting lines, a continuous sheet of dough is produced, and conveyed along multiple dough processing devices. When making the sheet, various rolling operations are performed, until a sheet with a desired thickness and width is obtained.

Subsequent processing steps may be cutting pieces to form individual dough products. Commonly, these pieces should have equal sizes and weights, which sets requirements to the homogeneity of the thickness and density of the dough sheet.

During forming of the sheet, several dough rolling steps are taken. After the sheet is formed with a quick reducer, a first step may be cross rolling the dough, followed by one or more reducers, in which a stationary roller rolls the dough in the direction of conveyance. The term stationary roller is used throughout this application to indicate a roller that is at a fixed position. Dough rolled by such roller has the tendency to have an unequal homogeneity in a direction perpendicular to the direction of conveyance, that is: its width direction. This leads to a larger variation in the weight of the separate dough pieces. In order to meet individual product specifications, especially minimum weight requirements, safe margins are used when cutting individual products. This however does not solve the spread in specifications of the individual products and leads to the use of more dough than strictly required.

European Patent application 18153519.6 of the same inventor proposes a device for rolling dough, comprising a conveyor, in particular an endless conveyor belt, for conveying a dough sheet in a direction of conveyance, a roller, for rolling the dough sheet with at least a directional component perpendicular to the direction of conveyance, wherein the device is configured for varying the distance between the upper surface of the conveyor and the roller during rolling according to any predetermined distance pattern as a function of the position of the dough roller in a direction perpendicular to the direction of conveyance. This definition implies that perpendicular to the direction of conveyance is still parallel to the plane of the conveyor surface. Normally this is called the width direction and the direction of conveyance is considered as the length direction. It cannot be the height direction since lifting the roller from the dough piece violates the feature "during rolling", since no dough is rolled when the roller is at a distance above dough level. To avoid any confusion or wrong interpretation of the claims, the height direction is explicitly disclaimed as the direction perpendicular to the direction of conveyance. Herein, the pattern may be different for every stroke and/or in both directions. Additionally, it may be possible to select the distance that is varied such that the dough is only touched during part of a stroke, for instance from the middle of the dough piece to an outer edge. The explanations and definitions given above in relation to the prior art are also applicable to the invention that is described in the following. Explicitly that may mean that in normal use, the direction of conveyance is considered as a length direction. The direction perpendicular thereto in which dough is rolled is the width direction. The direction in which the thickness of the dough sheet is influenced locally is the height direction.

Configurations like the one shown in EP2103217A2 are explicitly disclaimed from what the invention is and have nothing to do with the present invention. These comprise a carousel and do not provide any option to create any configurable height distribution in the width of a dough sheet that is being conveyed. The invention does allow to create any configurable height distribution in the width of a dough sheet that is being conveyed. Moreover the invention may allow to change this pattern in time, since with every stroke in the widt direction or drom left to right, a different height pattern may be applied.

The aforementioned European Patent application 18153519.6 provides a device that can be used to take away the disadvantages of the prior art thereof, and in particular the undesired effect a reducer induces in the dough. It has appeared that due to the fact that in the state of the art, the dough at the edges of the dough sheet has more space to expand to than the dough in the centre of the sheet, a higher density of the dough is obtained in the middle of the dough sheet. The device according to the invention enables to vary the distance between the upper surface of the conveyor and the roller in a different way than the prior art does and thereby to vary the density of the rolled dough in the direction perpendicular to the direction of conveyance. With this facility, it is amongst others possible to pre-compensate for the undesired effects of the reducing rollers. This is done by applying a height distribution over the width of the dough sheet that leads to a density that is inversely distributed to a known distribution induced by a reducer. A control system may be present to control the roller to pre-compensate for the undesired effects of the reducing rollers, in particular by applying a height distribution over the width of the dough sheet that leads to a density that is inversely distributed to a known distribution induced by a reducer. Evidently, by changing the distance between the upper surface of the conveyor and the roller the density of the dough can also be varied in the direction of conveyance, if such would be desired for any purpose.

Where "the distance between the upper surface of the conveyor and the roller" is mentioned in this application, the shortest distance between the mantle of the roller and the upper surface is meant, that is, from the lowest point of the roller to the highest point of the conveyor, in other words the distance of the gap that remains for the dough.

Although the device according to the present invention may comprise a suspension along which the roller is guided in a direction perpendicular to the direction of conveyance, wherein the suspension is movable in a direction from and toward the conveyor, this is not a necessary feature. The roller may be guided along a pair of bars, wherein the pair of bars is suspended such that their height can be varied with respect to the conveyor. One possible embodiment is to suspend the roller on a parallelogram construction, wherein the angles of the legs of the parallelogram are adjustable for moving the suspension from and toward the conveyor. An alternative embodiment comprises an eccentric transmission for moving the suspension from and toward the conveyor. Yet another embodiment comprises a robot arm for moving the roller. Such robot arm may additionally be configured for moving the roller with a directional component in the direction of conveyance of the dough, in order to avoid damage or tear of the dough, or to obtain a certain pattern.

The device may comprise at least one actuator for moving the suspension, which may in particular be a servo motor, and a controller for controlling the at least one actuator. Such controller may be configured for controlling the at least one actuator based on a predetermined setting which may for instance be a function of the position of the roller in a width direction of the dough. Alternatively, the dependency may be on an external signal such as a measurement signal from one or more sensors. Embodiments with multiple actuators are possible too according to the present invention. These actuators may for instance be arranged on either side of the conveyor belt.

According to the present invention at least a part of a support surface over which the conveyor is guided is provided with a height pattern or curvature at the position where the roller is situated for varying the distance between the upper surface of the conveyor and the roller during rolling. The conveyor is conveying the dough in the direction of conveyance, which may be referred to as, considered or called a length direction. The roller is moved over the (dough on the) conveyor with a movement perpendicular to the direction of conveyance. This is therefore the width direction of the conveyor and of the dough sheet. While being moved, the roller is of course rolling the dough. That means, an axis or shaft about which the roller rolls extends in the direction of conveyance. At the position where the roller is situated means that when and where the dough is rolled, the support surface over which the conveyor is guided is provided with a height pattern or curvature. In other words, the dough is rolled at a location where the underground of the conveyor is curved.

"With at least a directional component perpendicular to the direction of conveyance" is an equivalent of "in a direction with at least a directional component perpendicular to the direction of conveyance". Having a directional component in a certain direction means a movement in that certain direction, but possibly also at the same time moving in another direction. A diagonal movement both has a horizontal and a vertical directional component. A pure horizontal movement has no vertical directional component and vice versa.

As a result, also in this embodiment the distance between the upper surface of the conveyor and the roller is varied during rolling, but no active moving parts or movable parts are required, except for the roller that should evidently be able to cross the dough sheet. The roller itself may have a controllable and adjustable height with respect to the conveyor or a frame of the device, but this is an optional feature, since in principle only varying the conveyor surface is sufficient. The surface is provided with one or more elements that are elevated from the surface in order to push the conveyor toward the roller. In that case the roller may be moved in a straight line, but the dough is guided over a vaulted surface. A combination of embodiments is also thinkable, wherein both the trajectory the roller follows is not straight, and the conveyor is moving over a vaulted surface.

The support surface may preferably extend at least over a width of the roller, and it may be exchangeable, in order to use the device according to the present invention for creating various patterns or curvatures.

The invention will now be elucidated into more detail with reference to the following figures. Herein:

Figure 1A:
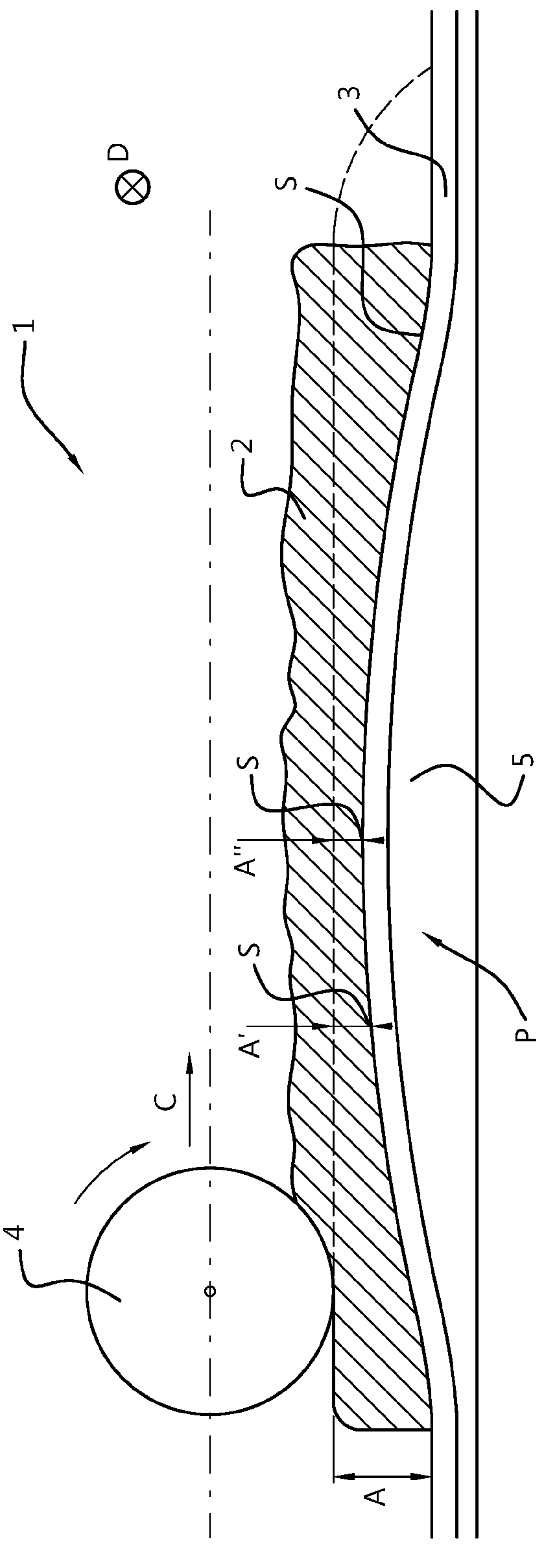
FIG. 1A shows a cross section of an embodiment of the present invention.
Figure 1B:
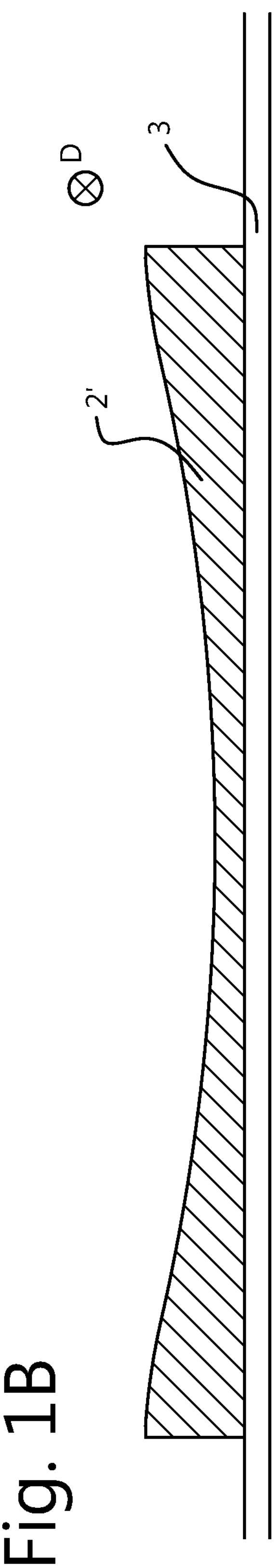
FIG. 1B shows a cross section of an embodiment of the present invention.
Figure 2:
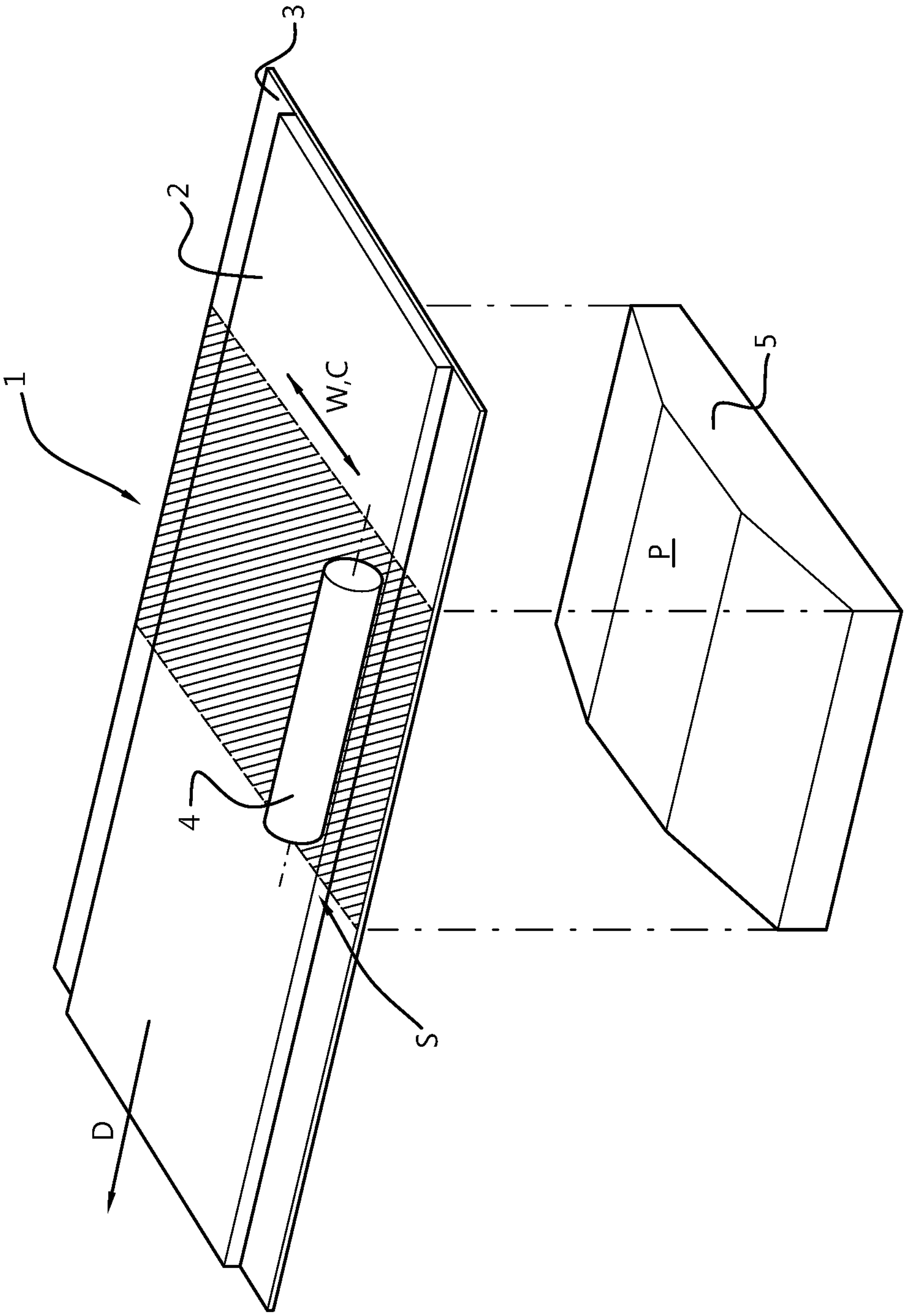
FIG. 2 shows a perspective view of an embodiment of the present invention.

FIGS. 1A, 1B, and 2 show a device 1 for rolling dough 2, comprising a conveyor 3 formed by an endless conveyor belt, for conveying a dough sheet in a direction of conveyance D (in this case a direction into the drawing), a roller 4, for rolling the dough sheet with at least a directional component C perpendicular to the direction of conveyance wherein the device 1 is configured for varying the distance A, A', A" between the upper surface S of the conveyor and the lowest position of the roller during rolling according to any predetermined distance pattern P as a function of the position of the dough roller in a direction C perpendicular to the direction of conveyance D, wherein at least a part of a support surface 5 over which the conveyor is guided is provided with a height pattern P or curvature at the position where the roller is situated for varying the distance A, A', A" between the upper surface S of the conveyor and the roller 4 during rolling.

The figure shows a dashed line indicating the top surface of the dough piece 2 after the roller 4 has completely moved in the direction C. The figure also shows the resulting cross section of the dough piece 2', once the conveyor 3 has moved further in the direction D and is no longer positioned on the support surface 5.

The above examples are in no way limiting the scope of protection of the present invention, as defined by the following claims.

The invention claimed is:

1. Device for rolling dough, comprising:

A conveyor, in particular an endless conveyor belt, for conveying a dough sheet in a direction of conveyance; and A roller, for rolling the dough sheet with at least a directional component perpendicular to the direction of conveyance, that is, its width direction;

wherein the height of the roller is fixed during rolling;

wherein

The device is configured for varying the distance between the upper surface of the conveyor and the roller during rolling according to any predetermined distance pattern as a function of the position of the dough roller in a direction perpendicular to the direction of conveyance; and characterized in that at least a part of a fixed support surface over which the conveyor is guided is provided with a height pattern or curvature at the position where the roller is situated for varying the distance between the upper surface of the conveyor and the roller, along the longitudinal axis of the roller and perpendicular to the length of the conveyor, during rolling.

2. Device according to claim 1, wherein the support surface with the height pattern or curvature extends at least over a width of the roller.

3. Device according to claim 1, wherein the support surface with the height pattern or curvature is exchangeable, in order to use the device according to the present invention for creating various patterns or curvatures.

4. Device according to claim 1, comprising a suspension along which the roller is guided in a direction perpendicular to the direction of conveyance, wherein the suspension is movable in a direction from and toward the conveyor.

5. Dough line comprising a device according to claim 1.

* * * * *